United States Patent Office 3,206,526
Patented Sept. 14, 1965

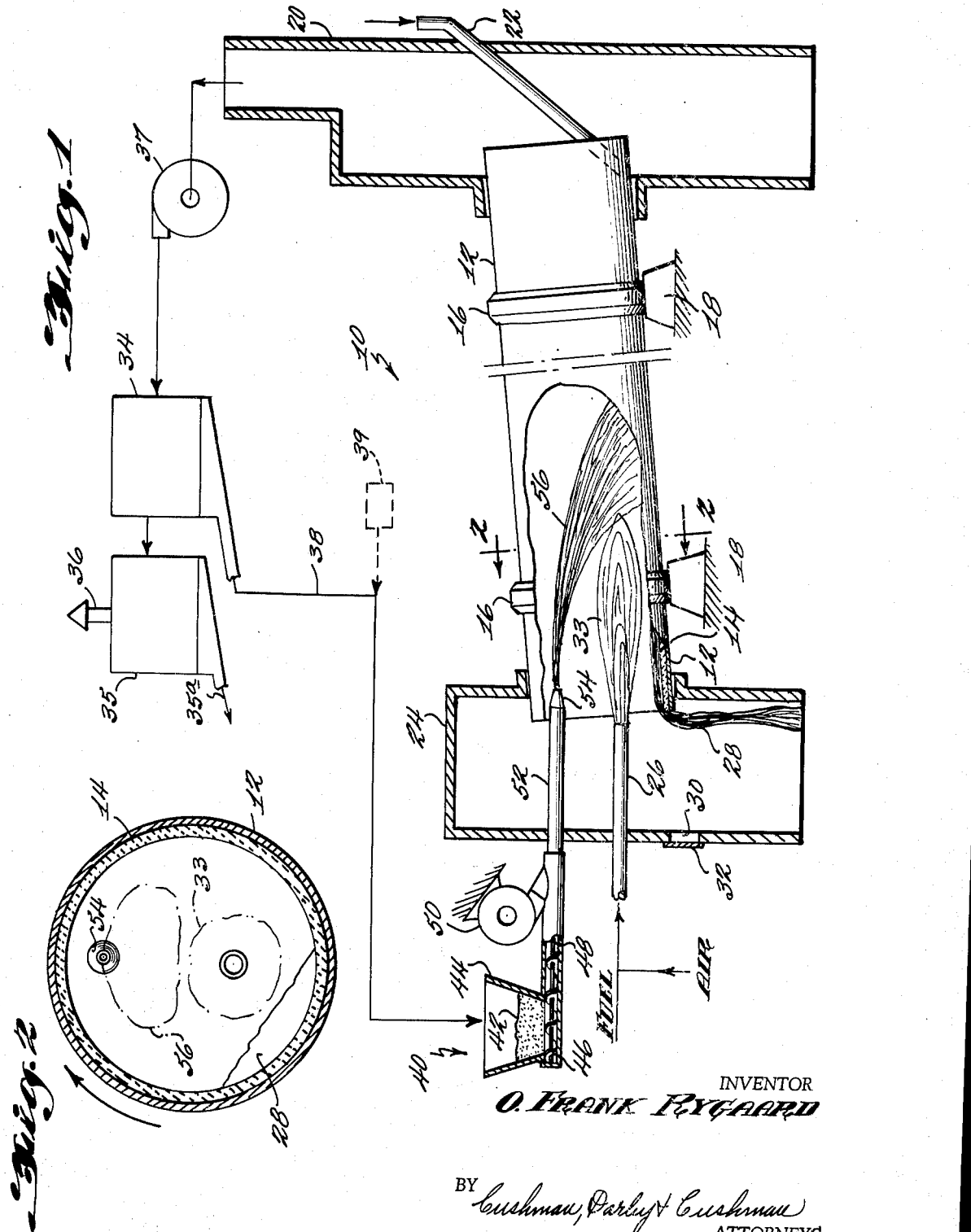

3,206,526
UTILIZATION OF CEMENT KILN DUST
Ole Frank Rygaard, Tremont Apts., Allentown, Pa.
Filed May 15, 1962, Ser. No. 194,895
4 Claims. (Cl. 263—52)

This invention relates to the utilization of kiln dust and in particular to the recycling of cement kiln dust into a rotary inclined kiln adjacent the flame therein.

In the conventional manufacture of cement the ground raw materials either dry or wet are fed to the higher end of a brick-lined rotary kiln which is slightly inclined from the horizontal. The kiln which may be, for example, 8 to 15 feet in diameter rotates at ½ to 2 r.p.m. so as to cause its contents to move gradually from their entrance point at the higher end toward the lower end. During their movement through the kiln, the contents are heated to a temperature as high as 2900° F. by a flame in the lower end of the kiln which is produced by introducing a fuel-air mixture into the lower end by means of a suitable burner. The calcined product, or clinker is discharged from the lower end, cooled and ground into cement.

The heating of the ground raw limestone and clay within the kiln drives off carbon dioxide and water vapor which pass out of the higher end along with the combustion products of the fuel to a stack. These gases normally will also contain some vapors of minerals such as chlorides and alkali oxides which have been volatilized in the kiln. In addition, the gases will contain a large amount of dust which has been formed by the grinding of the raw materials and by the breaking up of the particles during liberation of carbon dioxide and water vapor. The dust is generally removed from the stack gas and is disposed of as waste usually by merely storing the same in a pile which continues to grow in size as kiln operation continues.

Since the dust presents a problem of storage and loss of up to 5% or more of the raw material, various proposals as to its use have been made in the past. It has been suggested, for example, to add the dust directly to raw material which is fed to the kiln. Since the dust is almost always high in alkali metal oxides, this procedure is not generally satisfactory because the resulting clinker has an undesirably high alkali content.

Another procedure for utilizing the dust is described in Patent No. 2,477,262 issued July 29, 1949. In that procedure the dust is separated from the stack gas and the particles having a too high alkali content are removed. To the remaining dust, corrective additions of ground minerals are made if necesary for proper clinker composition and the mixture is introduced into the combustion zone, preferably directly into the flame, where it is immediately formed into clinker. Simultaneously, much of the alkalis in the dust are volatilized and pass out of the kiln with the flue gas.

However, certain disadvantages are associated with the process described in the patent. Continuous and accurate control of the composition of the dust is difficult so that the composition of the clinkered dust will generally vary from that of the clinker already formed in the kiln. Since the dust is clinkered separately from the main raw material feed it is apparent that changes in composition of the clinkered dust will affect the composition of the final clinker. Even more important, however, is the effect of the dust on the flame. It is clear that the introduction of varying quantities of dust of varying composition into the combustion zone and particularly into the flame will cause variations in burning conditions and temperature. This is highly undesirable because accurate flame control is necessary not only for producing good quality clinker but also for maintaining fuel consumption at a minimum.

Still further, the introduction of dust into the flame renders the measurement of flame and clinker temperature difficult by the usual optical or visual methods employed in cement kilns. The dust clouds the flame and clinker so as to make difficult and unreliable the temperature measured with an optical pyrometer or estimated by the eye of an experienced operator, and the problem is aggravated by changes in dust composition. Of course other temperature-measuring means can be installed but their use and maintenance is complicated by the corrosive conditions in the kiln.

It is the primary object of the present invention to provide a method of recycling kiln dust into the kiln for effectively treating the dust without adversely affecting the kiln product or the flame within the kiln.

It is a further object of the present invention to recycle dust to a kiln to increase the kiln production while maintaining uniform high quality kiln product and uniform burning conditions within the kiln.

It is a further object to recycle kiln dust to a kiln for the above purpose and simultaneously to utilize the dust to protect the exposed lining of the kiln from the heat of the flame.

These and other objects and advantages are achieved by the present invention by introducing the dust, suspended in a gas, into the hot end of the kiln so as to form a dust cloud adjacent but not within the flame or combustion zone. By this seemingly simple expedient dust of variable quantity and composition is converted to clinker without affecting the burning of the flame, without clouding the flame from optical or visual measurement and without creating any substantial changes in the composition of the clinker being discharged from the kiln. Still further, the dust cloud acts as an insulating layer between the flame and the exposed wall of the kiln and thereby reduces the rate of decomposition of the wall in this area of normally high burnout rate.

The invention will be more clearly understood by a reading of the following description in conjunction with the drawing in which:

FIGURE 1 is a side elevational view, partly broken away, of a cement kiln embodying the principles of the present invention; and FIGURE 2 is a sectional view, on a slightly enlarged scale, taken on the line 2—2 of FIGURE 1.

As seen in the drawing, a clinker producing installation 10 of conventional construction includes a long cylindrical steel kiln 12 lined with refractory brick 14. The kiln 12 is inclined slightly from the horizontal and is mounted for rotation by means of suitable circumferential bearing surfaces 16 which ride on idler wheels or rollers with supports 18. Any suitable means for rotating the cylinder may be provided such as a girth gear (not shown) meshing with a driven pinion gear (not shown).

The upper or cool end of the kiln 12 communicates with a stack 20 for carrying off gases and is provided with raw material delivery means such as conduit 22. The lower or hot end of the kiln 12 communicates with the interior of a stationary hood 24 which acts as a support for a fuel burner 26 and as a receiving box for clinker 28 being discharged from the kiln 12. Conveniently the hood is provided with an opening 30 facing the end of the kiln 12 and a removable closure member 32 so that the interior of the lower end of the kiln may be visually observed. Conventionally, the burner 26 may be simply a pipe to which a combustible mixture of air with powdered coal, atomized oil or gas is delivered under pressure by any conventional means known in the art so as to direct a flame 33 generally longitudinally into the kiln 12 but not directly against the clinker 28 therein or the lining 14.

Dust-laden gas discharged from the higher end of the kiln 12 is delivered by means of a blower 37 to a conventional dust collector 34, such as a cyclone collector, where the coarser particles are removed. The gas and the fine dust particles, which are high in alkali content then pass to a second collector 35, such as a filter bag collector, from which the gas is discharged through a vent 36. The fine dust particles which are collected in the collector 35 are removed at 35a and may be discarded as waste or sold for fertilizer. The coarse particles collected in the collector 34 are conveyed by any suitable means 38 to a feed apparatus 40 located at the hood 24. If desired, means illustrated at 39 may be provided for adding mineral or chemical constituents to the separated dust.

The feed apparatus 40 may conveniently be of any known type designed to disperse a finely divided solid in a gas. As shown, the dust 42 from the separator is delivered to a hopper 44 in the bottom of which is located a screw conveyor 46. Outside the hopper the screw passes through a pipe 48 to the far end of which is connected the outlet of an air blower 50. A feed pipe 52 connects with the end of pipe 48 and passes through the hood 24 into the discharge end of the kiln where it terminates in a tapered discharge nozzle 54. According to the invention the nozzle 54 is located above the burner 26 and is arranged to discharge its mixture of air and dust adjacent but not into the flame 33.

In use, the installation 10 is operated in conventional manner by continuously adding ground raw material to the higher end of the rotating kiln 12 through conduit 22. As the raw material travels toward the lower end of the kiln, it is gradually heated by the blast of hot gases passing in contact therewith. Near the higher end the temperatures are moderate and serve to drive off free moisture from the raw material. Toward the middle the temperature may be, for example, 1800° F. at which carbon dioxide is expelled from the material. The hottest part of the cylinder is, of course, adjacent the flame 33 which may be 20 to 35 feet long. Here the raw material is raised to a temperature at which it partially melts and forms the cement clinker 28. After being discharged from the kiln 12 the clinker 28 is cooled and ground into cement.

The dust which is introduced with the raw material and which is formed during the heating process passes out of the kiln with the gases and is conducted from the stack 20 to the collectors 34 and 35 where the coarse and fine particles, respectively, are collected. According to the invention the separated coarse dust particles are then introduced, as by the feed device 40, to the lower end of the kiln 12 between the flame and the exposed brick lining 14. This is preferably accomplished by locating the feed pipe 52 above and generally parallel to the burner pipe 26 and by operating the blower 50 and the conveyor 46 so as to forcibly eject a dust-air mixture in the form of a cloud 56 which overlies all or most of the flame 33. Most of the dust particles thereby fall to the bottom of the kiln beyond the end of the flame 33. Some of the heavier particles may fall through the end of the flame and some of the lighter particles will pass entirely through the kiln 12 with the gas stream. The particles which remain in the kiln are converted to clinker and are discharged with the remainder of the clinker 28 as the kiln 12 rotates.

A number of advantages have been found to result from introducing the dust in the manner described. It is apparent from FIGURE 2 that only a small part of the lining 14 is covered with a layer of kiln contents during operation and that for a major portion of each revolution a given section of lining is exposed to direct radiation of heat from the flame 33. The introduction of the dust cloud 56 above the flame 33 reduces the amount of radiation absorbed by the lining 14 in this hottest part of the kiln and thereby increases the life of the lining.

Another important advantage of the present process is that the temperature and burning characteristics of the flame 33 are relatively unaffected by changes in the composition and amount of dust delivered to the kiln, because the cloud remains essentially distinct from the flame. On the other hand, when the dust is mixed with the flame, the rate of burning and the absorption of heat from the flame by the dust will be affected by changes in the composition and amount of the dust. The resulting variations in flame temperature render difficult the proper control of the kiln because high quality clinker can be obtained only with close control temperature.

A further advantage of the present invention lies in the fact that the dust cloud does not interfere with visual or optical methods of measuring flame and clinker temperature. The presence of dust in the flame in the aforementioned prior process clouds the color of both flame and clinker thus making temperature measurement difficult.

A still further advantage of the present process is that the dust in protecting the lining 14 becomes heated sufficiently to volatilize some of the objectionable alkalis yet the unvolatilized dust does not form clinker until it reaches the bottom of the kiln where it reacts with the material there. That is, the solid dust particles in the cloud tend to retain their chemical identity until they are thoroughly mixed with and react with appropriate constituents in the bottom of the kiln. Thus, in the present process the dust is more or less uniformly distributed in, or diluted with, the other raw material. Fluctuations in the composition or amount of the dust thereby have little tendency to produce localized differences in the composition of the clinker. However, in the prior process of introducing the dust directly into the flame, the dust becomes clinkered before reaching the bottom of the kiln. Thus, in the prior process fluctuations in the composition or amount of the recycled dust is likely to produce localized differences in the clinker due to incomplete mixing in the discharge part of the kiln.

While the invention has been described and illustrated in terms of a process and apparatus for making cement clinker, it is contemplated that the principles of the invention are applicable to other types of kilns. The particular embodiment described is given by way of illustration and the details thereof are not intended to be limiting except as they appear in the appended claims.

What is claimed is:

1. In a method of treating material in a kiln to form clinker from raw material which includes the steps of: introducing a flame generally longitudinally into the hot end of an inclined kiln in spaced relationship to the inner wall of said kiln, adding raw material to the opposite, cool end of the kiln; rotating said kiln to move said raw material through said kiln and past said flame whereby said raw material is heated to a desired temperature and discharged from said kiln; and returning dust from said cool end to said hot end, the improvement comprising: ejecting said dust into said hot end of the kiln at a location spaced from said flame and in a direction generally parallel to said flame and with sufficient force to form a cloud between said flame and portion of said inner wall which is directly exposed to said flame, said cloud being substantially coextensive with said flame so as to protect said wall portion from said flame.

2. A method as in claim 1 wherein dust is ejected into said hot end at a location above said flame and with sufficient force to carry most of the particles of said dust beyond the end of the flame before they reach the bottom of the kiln whereby said particles are converted to said clinker after mixing with said raw material thereby minimizing the effect of changes in dust composition on the composition of the clinker discharged from said kiln.

3. In a method of operating a cement kiln which includes the steps of: introducing a flame generally longitudinally into the hot end of an inclined kiln in spaced relationship to the inner wall of said kiln; adding raw material to the opposite, cool end of the kiln; rotating said kiln to move said raw material through said kiln and past said flame whereby said raw material is converted to cement clinker and discharged from seaid kiln and returning dust from said cool end to said hot end, the improvement comprising: removing kiln dust particles from said kiln in admixture with kiln gases; separately removing fine dust particles and coarse dust particles from said kiln gases; discarding said fine particles; dispersing said separated coarse particles in a gas stream; and ejecting said dispersed coarse particles into the hot end of said kiln at a location spaced from said flame and in a direction generally parallel to said flame and with sufficient force to form a cloud between said flame and a portion of said inner wall which is directly exposed to said flame, said cloud being substantially coextensive with said flame so as to protect said wall portion from said flame.

4. A method as in claim 3 wherein said stream with said coarse dust dispersed therein is ejected into said hot end at a location above said flame and with sufficient force to carry most of the particles of said dust beyond the end of the flame before they reach the bottom of the kiln whereby said particles are converted to said clinker after mixing with said raw material thereby minimizing the effect of changes in dust composition on the composition of the clinker discharged from said kiln.

References Cited by the Examiner
UNITED STATES PATENTS 2,116,030   5/38   Lindman _____ 263—32
2,965,366   12/60  O'Mara et al. _____ 263—32

MAURICE A. BRINDISI, *Primary Examiner.*

PERCY L. PATRICK, *Examiner.*